United States Patent
Campbell et al.

(10) Patent No.: US 10,566,683 B1
(45) Date of Patent: Feb. 18, 2020

(54) SYSTEM AND METHOD FOR AN AIRCRAFT COMMUNICATING WITH MULTIPLE SATELLITE CONSTELLATIONS

(71) Applicant: Rockwell Collins, Inc., Cedar Rapids, IA (US)

(72) Inventors: Thomas B. Campbell, Cedar Rapids, IA (US); Lee M. Paulsen, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 69 days.

(21) Appl. No.: 15/403,134

(22) Filed: Jan. 10, 2017

Related U.S. Application Data

(60) Provisional application No. 62/348,602, filed on Jun. 10, 2016.

(51) Int. Cl.
| | | |
|---|---|---|
| *H01Q 1/28* | (2006.01) | |
| *H01Q 21/24* | (2006.01) | |
| *H01Q 21/22* | (2006.01) | |

(52) U.S. Cl.
CPC ............ *H01Q 1/287* (2013.01); *H01Q 1/288* (2013.01); *H01Q 21/22* (2013.01); *H01Q 21/24* (2013.01)

(58) Field of Classification Search
CPC .......... H01Q 1/28; H01Q 1/286; H01Q 1/287; H01Q 1/288; H01Q 21/22; H01Q 21/24
See application file for complete search history.

(56) References Cited

U.S. PATENT DOCUMENTS

| | | | |
|---|---|---|---|
| 4,001,834 A | 1/1977 | Smith | |
| 4,782,346 A | 11/1988 | Sharma | |
| 6,421,021 B1 | 7/2002 | Rupp et al. | |
| 6,765,535 B1 | 7/2004 | Brown et al. | |
| 6,831,610 B2 * | 12/2004 | Quagliaro | ................ H01Q 1/28 343/705 |
| 6,844,855 B2 * | 1/2005 | Carson | ................... H01Q 21/00 343/705 |
| 6,999,022 B1 * | 2/2006 | Vesel | .................... G01S 13/765 342/30 |
| 7,624,951 B1 * | 12/2009 | Kraft | ........................ B64C 1/36 244/1 R |

(Continued)

FOREIGN PATENT DOCUMENTS

| | | |
|---|---|---|
| EP | 1 693 922 A1 | 8/2006 |
| WO | WO-2007/047567 | 4/2007 |

OTHER PUBLICATIONS

European Search Report for EP Application No. 18075006.9 dated Oct. 1, 2018. 9 pages.

(Continued)

*Primary Examiner* — Daniel Munoz
*Assistant Examiner* — Patrick R Holecek
(74) *Attorney, Agent, or Firm* — Donna P. Suchy; Daniel M. Barbieri

(57) ABSTRACT

A satellite communication system for an aircraft communicates with multiple satellite constellations. The communication system includes a phased array antenna system and a transceiver. The transceiver is configured to communicate with a number of satellite constellations and configured to support simultaneously links to two or more constellations via the phased array antenna system. The satellite constellations can be micro-satellite, MEO, LEO, and GEO constellations.

20 Claims, 11 Drawing Sheets

(56) References Cited

U.S. PATENT DOCUMENTS

| | | | |
|---|---|---|---|
| 8,182,103 | B1 | 5/2012 | Brown et al. |
| 8,736,504 | B1 | 5/2014 | West et al. |
| 8,963,790 | B2 | 2/2015 | Brown |
| 9,455,500 | B1 | 9/2016 | West et al. |
| 9,647,748 | B1 | 5/2017 | Mitchell |
| 9,716,309 | B1 | 7/2017 | Elsallal |
| 9,843,107 | B2 | 12/2017 | Corman et al. |
| 9,848,370 | B1 | 12/2017 | Freedman et al. |
| 2006/0202777 | A1 | 9/2006 | Deckman et al. |
| 2013/0088391 | A1 | 4/2013 | Corman et al. |

OTHER PUBLICATIONS

Notice of Allowance for U.S. Appl. No. 15/600,497 dated Sep. 21, 2018. 5 pages.
Non-Final Office Action for U.S. Appl. No. 15/600,497 dated Apr. 25, 2018. 9 pages.
Non-Final Office Action for U.S. Appl. No. 15/413,052 dated Feb. 27, 2019.
Final Office Action for U.S. Appl. No. 15/413,052 dated Aug. 9, 2019. 5 pages.
Notice of Allowance for CA Patent Application No. 3003999 dated Feb. 26, 2019. 1 page.
Foreign Office Action for EP Application No. EP 18075006.9 dated Oct. 15, 2019. 4 pages.
Notice of Allowance for U.S. Appl. No. 15/413,052 dated Nov. 12, 2019. 5 pages.
Foreign Office Action for Brazil Patent Application No. 102018009865.9 dated Oct. 4, 2019. 6 pages.
Second Office Action for CN Patent Application No. 201810455550.0 dated Oct. 23, 2019. 5 pages.

* cited by examiner

| PAM Look Angle & Aperture Loss vs Latitude |||
|---|---|---|
| Latitude (degrees) | LOOK Angle (degrees) | Aperture Loss (dB) |
| 0 | 90 | 0.0 |
| 5 | 84 | 0.0 |
| 10 | 79 | -0.1 |
| 15 | 73 | -0.2 |
| 20 | 67 | -0.4 |
| 25 | 62 | -0.7 |
| 30 | 56 | -1.0 |
| 35 | 50 | -1.4 |
| 40 | 45 | -1.8 |
| 45 | 39 | -2.04 |
| 50 | 34 | -3.1 |
| 55 | 28 | -3.9 |
| 60 | 23 | -4.9 |
| 65 | 18 | -6.2 |
| 70 | 12 | -8.0 |
| 75 | 7 | -10.9 |
| 76 | 6 | -11.7 |
| 77 | 5 | -12.6 |
| 78 | 4 | -13.8 |
| 79 | 3 | -15.3 |
| 80 | 2 | -17.5 |
| 81 | 1 | -21.3 |
| 81.949 | 0 | -67.5 |

Satellite @ Zenith

Practical Limit

Satellite @ Horizon

| Assumptions ||
|---|---|
| ///// | Rated Service |
|  | Degraded Service |
| \\\\\ | Service Not Available |

FIG. 9
Prior Art

SYSTEM AND METHOD FOR AN AIRCRAFT COMMUNICATING WITH MULTIPLE SATELLITE CONSTELLATIONS

CROSS-REFERENCE TO RELATED PATENT APPLICATIONS

This application claims the benefit of and priority to U.S. Application 62/348,602, filed Jun. 10, 2016, assigned to the assignee of the present application, and incorporated herein by reference in its entirety.

BACKGROUND

The present disclosure relates generally to communication systems. More particularly, the present disclosure relates to a satellite communication transceiver capable of operation with two or more satellite constellations.

Demand for data communications in remote areas is increasing. As the number of users and data requirements for remote communication applications increases, the demand for data capacity increases. For example, the demand for data communications on aircraft is expected to increase beyond the capacity associated with current and next generation satellite communication systems. Conventional airborne satellite communication systems (e.g., the GoGo's 2Ku system) utilize single Ku band beam antennas capable of communicating with a single satellite constellation or system. Proposed data capacity for constellations of low earth orbit (LEO) satellites do not source more than four hundred megabytes per second (Mbps) peak data to an airplane which is not enough capacity for the desires of full load of passengers on a transport aircraft, especially aircraft flying along flight paths that are near other aircraft. Further, traveling globally can result in areas which are not covered by a single satellite constellation. Achieving seamless global coverage with a single satellite constellation can be difficult.

Thus, there is a need for airplane satellite communication system that can simultaneously support connectivity to multiple satellite constellations. Further, there is need for a satellite communication system which has seamless global coverage. Further still, there is a need for a satellite communication that can communicate with LEO and geostationary earth orbit (GEO) satellite constellations. Further still, there is a need for a satellite communication system that can communicate with two different GEO or LEO networks to increase data capacity and provide better global coverage. There is also a need for faster, less expensive, more robust, low latency, high bandwidth wireless connectivity in remote locations.

SUMMARY OF THE INVENTION

In one aspect, embodiments of the inventive concepts disclosed herein are directed to a satellite communication system for an aircraft communicating with at least one satellite constellation. The communication system includes a phased array antenna system and a transceiver. The transceiver is configured to communicate with a number of satellites in the at least one constellation and configured to support links to the two or more satellites via the phased array antenna system.

In another aspect, embodiments of the inventive concepts disclosed herein are directed to a phased array satellite communication system for an aircraft. The phased array satellite communication system includes a phased array antenna system, and a transceiver configured to communicate with a number of satellite constellations. The transceiver is configured to provide a first transmit signal for a first beam to a first satellite constellation system and a second transmit signal for a second beam to a second satellite constellation system. The transceiver is also configured to receive simultaneously a first receive signal from the first satellite constellation system and a second receive signal from the second satellite constellation system.

In another aspect, embodiments of the inventive concepts disclosed herein are directed to a method of communicating data to and from an aircraft. The method includes establishing a communication link with a phased array antenna system to a low earth orbit satellite system, and establishing a communication link with the phased array antenna system to a geostationary orbit satellite system.

BRIEF DESCRIPTION OF THE DRAWINGS

The exemplary embodiments will become more fully understood from the following detailed description, taken in conjunction with the accompanying drawings, wherein like reference numerals refer to like elements, in which:

FIG. 9 is a table illustrating prior art performance of a satellite communication network;

DETAILED DESCRIPTION

Reference will now be made in detail to exemplary embodiments of the disclosure, examples of which are illustrated in the accompanying drawings.

Some embodiments relate to a phased array satellite communication system for an aircraft. The phased satellite communication system includes a phased array antenna assembly and a transceiver. The transceiver is configured to communicate with satellite constellations and can simultaneously or near simultaneously support links to two or more constellations via the phased array antenna system. In some embodiments, an aviation satellite communication system provides wide azimuth coverage with an active electronic scanning array (AESA) antenna without a significant a tradeoff in off-boresight gain or the use of additional separate, unitary panels whose pointing angles are spread across the desired azimuth space.

In some embodiments, the aviation satellite communication system utilizes a single or multi-panel AESA antenna assembly for communication with a microsatellite, LEO satellite, medium earth orbit (MEO) satellite, GEO satellite, and combinations thereof. In some embodiments, a pair of multi-panel AESA antenna assemblies are mounted port and starboard and are disposed laterally along the longitudinal axis of an aircraft to provide wide azimuth angles. In some embodiments, the aviation satellite communication system advantageously uses AESA antennas capable of rapid beam movement and reconfigurable patterns to communicate with planned GEO microsatellite satellite schemas. The AESA-based communication system, also known as an active phased array communication system, is a type of phased array communication system whose transmitter and receiver functions are composed of numerous small solid-state transmit/receive elements in some embodiments. In some embodiments, the AESA provides wide azimuth coverage suitable for avionic applications.

Figure 1:
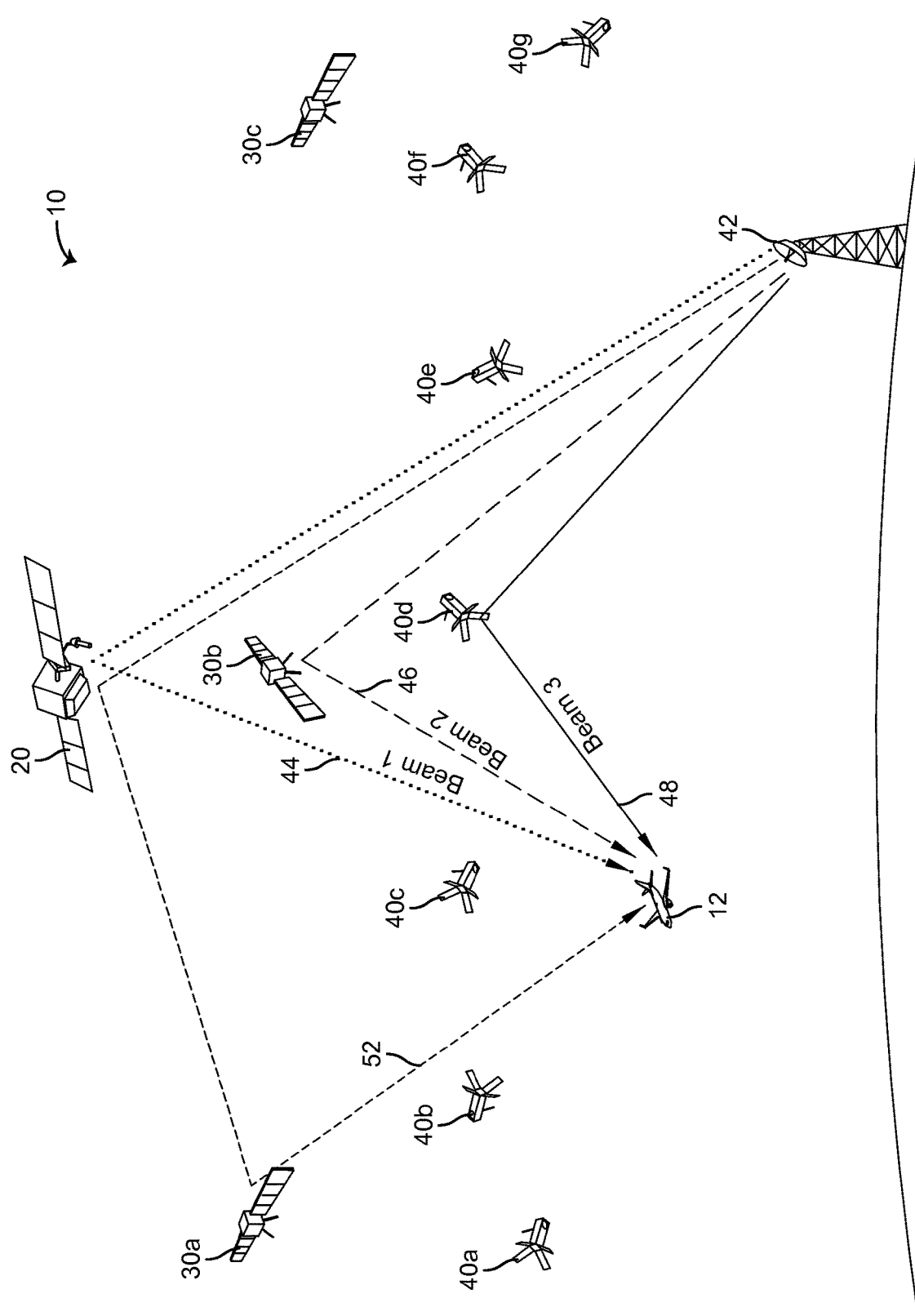
FIG. 1 is a perspective view schematic drawing of a satellite based aviation communication network in communication with an aircraft according to some embodiments.

With reference to FIG. 1, an environment 10 includes an aircraft 12, a GEO satellite 20, MEO satellites 30A-C, LEO satellites 40A-G and a ground station 42. The aircraft 12 communicates with the GEO satellite 20 which is part of a GEO satellite network or constellation via a beam 44. The GEO satellite 20 can communicate with the MEO satellite 30A or other MEO satellites 30B-C in some embodiments. The MEO satellites 30A-C are part of a MEO satellite constellation that communicates with the aircraft 12 via a beam 46 and a beam 52. A satellite constellation as used herein refers to two or more satellites (which may be operated by different owners and operators) arranged in one or more networks or one or more orbital types. In some embodiments, the aircraft 12 could communicate with two or more satellites, two or more from the same constellation or each from different constellations.

The aircraft 12 communicates with the LEO satellite 40D of the LEO satellites 40A-G which are part of a LEO satellite constellation via a beam 48. The LEO satellite 40D can communicate with the ground station 42. The satellite 30B or other satellites in the MEO constellation associated with the MEO satellites 30A-B can communicate with the ground station 42. The beams 44, 46, 48 and 52 represent transmit and/or receive beams in some embodiments.

Advantageously, the aircraft 12 is capable of simultaneously or near simultaneously communicating with more than one satellite constellation. For example, the aircraft 12 communicates via the beams 44, 46, 48 and 52 with at least two of the GEO satellite constellation associated with the satellite 20, the MEO satellite constellation associated with the satellites 30A-C, and the LEO satellite constellation associated with satellites 40A-G. In some embodiments, aircraft 12 can simultaneously communicate with three or more satellite constellations and with ground station 42 when within range. In some embodiments, the aircraft 12 communicates with two MEO or two LEO satellite constellations.

In some embodiments, the aircraft 12 uses a phased array-based satellite communication terminal configured for fast-switching between multiple satellite constellations. In some embodiments, the aircraft 12 uses a multi-beam phased array-based satellite communication terminal configured for simultaneous operation with multiple constellations. In some embodiments, the aircraft 12 uses a phased array-based satellite communication terminal configured for supporting multiple modems simultaneously, either through channel-bonding on a single network for increased throughput or with multiple intermediate frequency (IF) interfaces communicating with parallel modems working on independent networks.

Figure 2:
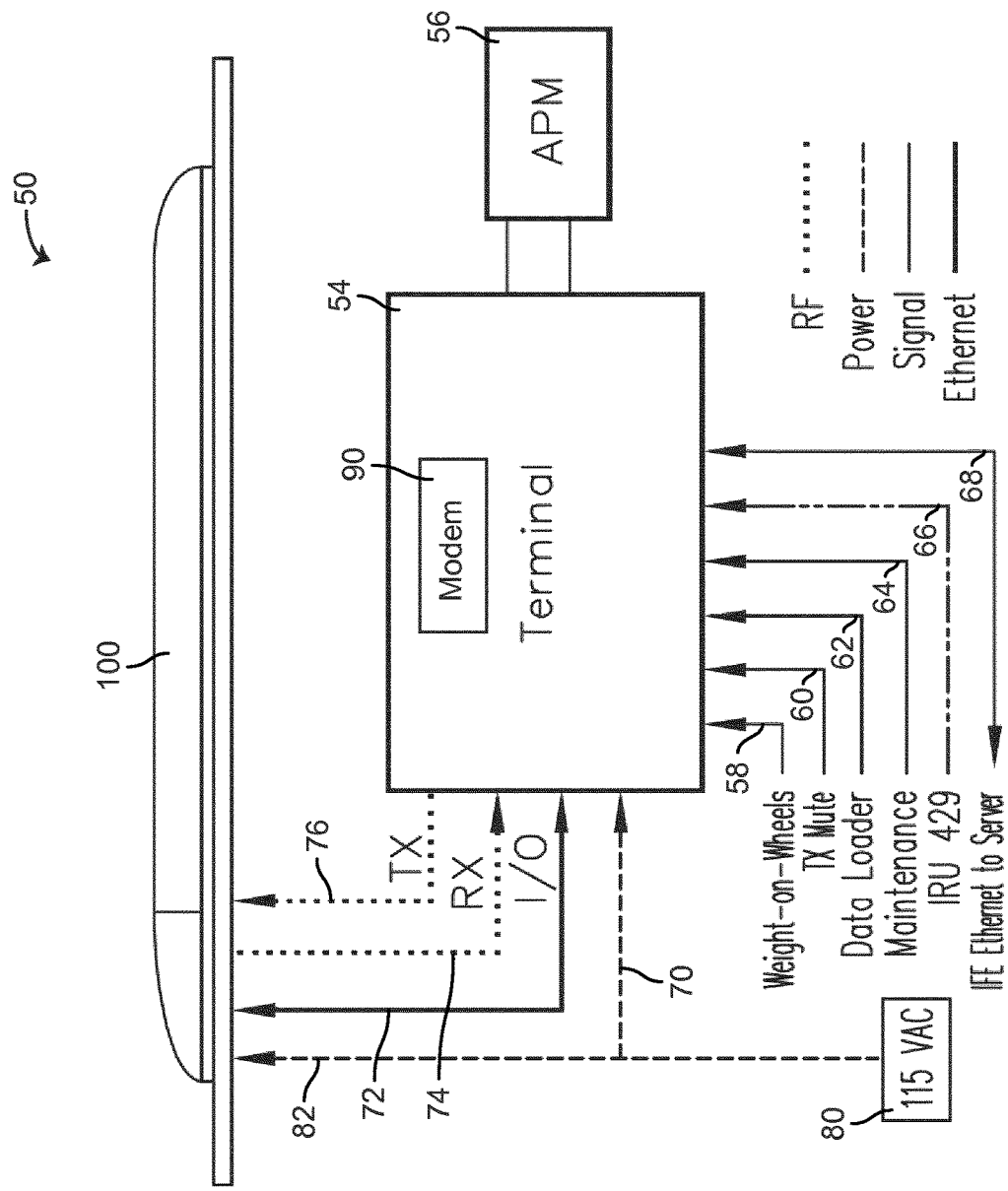
FIG. 2 is a planar side view schematic drawing of a satellite communication system including a terminal (shown in block diagram form) and a phased array antenna assembly according to some embodiments.

With reference to FIG. 2, the aircraft 12 (FIG. 1) is equipped with a communication system 50 including a terminal 54, an aircraft personality module (APM) 56, and an antenna assembly 100. The terminal 54 receives a weight on wheels signal at an input 58, a transmit mute signal at an input 60, a data loader at an input 62, a maintenance signal at an input 64, inertial reference unit (IRU) 429 signals at a bus input 66 and Ethernet signals at a input bus 68. Alternative other inputs and outputs can be provided to terminal 54. The inputs 58, 60, 62, 64, 66 and 68 can be coupled with various types of equipment on the aircraft 12 and line replaceable units. The inputs 58, 60, 62, 64, 66 and 68 are input/output terminals capable of bi-directional communication in some embodiments. The terminal 54 responds to the various signals on the inputs 58, 60, 62, 64, 66 and 68 for enabling communications and maintenance of the communication system 50.

The APM 56 stores configuration data and can be used with a network interface controller for the aircraft 12. The APM 56 includes a SIM card for storing information for the terminal 54. The APM 56 provides identification information for the terminal 54 and the modem(s) inside the terminal 54. In some embodiments, the terminal 54 is replaceable without replacing the APM 56.

The terminal 54 is powered via a power input 70. An input/output (I/O) bus 72 is also coupled to the terminal 54 and the antenna assembly 100. The I/O bus 72 allows control and data signals to be communicated between the terminal 54 and the antenna assembly 100. A receive line 74 is coupled between the terminal 54 and the antenna assembly 100 for radio frequency (RF) receive signals and a transmit line 76 is coupled between the terminal 54 and the antenna assembly 100 for RF transmit signals. The RF signals are intermediate frequency (IF) signals or baseband signals in some embodiments. A power source 80 provides power to the terminal 54 via the input 70 and to the antenna assembly 100 via an input 82. The terminal 54 includes a modem circuit 90. The modem circuit 90 provides modulation and demodulation operations for the communication system 50.

The antenna assembly 100 is disposed on aircraft 12 at various locations. The antenna assembly 100 is disposed outside of the fuselage of the aircraft 12 for transmitting and receiving RF signals to and from satellite networks in some embodiments. In some embodiments, the antenna assembly 100 is disposed on a top portion of the aircraft 12.

In some embodiments, the antenna assembly 100 is a multi-panel AESA antenna system for the communication system 50 that is installed on an outside skin of the aircraft 12 (FIG. 1). In some embodiments, the antenna assembly 100 provides a large aperture antenna constructed of multiple Electronically Scanned Array (ESA) panels. The multiple panel design of the antenna assembly 100, with single board element and amplifier design, provides for a large combined aperture without the aerodynamic, weight, manufacturing, and maintenance issues inherent with large panels in some embodiments.

In some embodiments, the satellite communication system 50 is configured for element level multi-beam formation. The multi-beam formation takes advantage of the fast beam-switching capability of a phased array design of the antenna assembly 100 to hop between multiple satellite constellations quickly. The satellite communication system 50 views different satellites 20, 40A-D, and 30A-G and hops a beam between them relatively quickly and in a coordinated fashion to effectively receive data simultaneously or near simultaneously in some embodiments.

In some embodiments, the satellite communication system 50 is configured to support links to multiple constellations simultaneously or near simultaneously, regardless of protocol constraints that may prevent fast beam-hopping. In some embodiments, the satellite communication system 50 is configured to support links simultaneously (whether using two satellite networks or one) using a multi-modem terminal with channel-bonding to improve overall throughput on the aircraft 12. The multi-modem terminal can service the same network to aggregate more channels or service different networks. In some embodiments, channel bonding is used to connect to the OneWeb network using the GEO satellite 20 and another network using the GEO satellite 30A. In some embodiments, half of a user's data is pulled from one network using the beam 48 and half of the user's data is pulled from another network using the beam 44.

In some embodiments, the satellite communication system 50 is configured to receive data from the GEO satellite 20 as opposed to the LEO satellites 40A-G when the aircraft 12 is near the equator. Control rules prevent the satellite communication system 50 from radiating at the equator due to the potential for interference. In some embodiments, the satellite communication system 50 uses location to select particular satellite constellations for communication. For example, as the aircraft 12 is in a region where two or more constellations can be accessed, the satellite communication system 50 can choose to access both networks until one of the constellations is no longer accessible. When the constellation is no longer available, the aircraft can access two satellites from the same constellation if possible or access another constellation that is available. Location information can be used to choose MEO satellites 30A-C or LEO satellites 40A-G at higher latitudes (e.g., polar regions) constellations where the GEO satellite 20 is less accessible.

Figure 3:
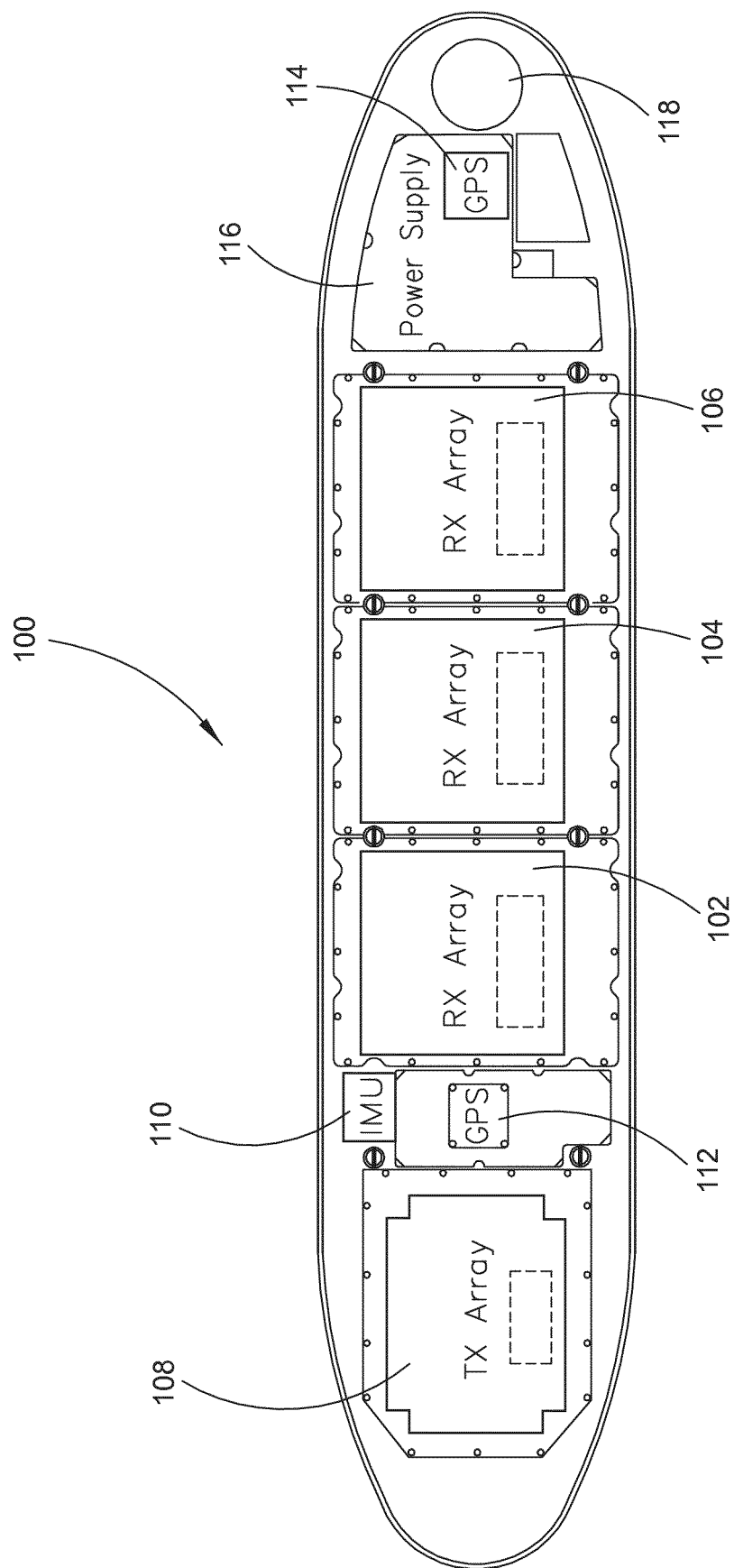
FIG. 3 a planar top view schematic drawing of the phased array antenna system of the satellite communication system illustrated in FIG. 2 according to some embodiments.

With reference to FIG. 3, the antenna assembly 100 includes three receive (Rx) ESAs 102, 104, and 106 that provide a combined aperture capable of providing operation in a low power satellite network environment in some embodiments. In some embodiments, the antenna assembly 100 includes different numbers of Tx and Rx ESAs (e.g., four Tx sub arrays and four _Rxsub arrays, two Tx sub arrays and six Rx sub arrays, etc.). In some embodiments, the configuration of the Rx ESAs 102, 104, and 106 provide sufficient aperture and redundancy to maintain high quality performance with two or more of LEO and MEO satellite networks (e.g., the networks including the MEO satellites 30A-C, the LEO satellites 40A-G (FIG. 1)) and GEO based satellite networks (e.g., the network including the GEO satellite 20). In some embodiments, the antenna assembly 100 includes a transmit (Tx) ESA 108, an inertial measurement unit 110, a global navigation satellite system (GNSS) receiver 112, a GNSS receiver 114, a power supply 116, and a bulkhead pressure seal 118. The ESAs 102, 104, 106, and 108 are circuit board-based ASEAs in some embodiments.

In some embodiments, the satellite constellations are associated with OneWeb LEO and other GEO 124 networks which provide aircraft, passenger, and crew network connectivity. Additional Tx ESAs 108 can be provided if transmit throughput needs are large.

The GNSS receivers 112 and 114 communicate with GNSS satellites to determine positioning for the satellite communication system 50. The use of two GNSS receivers 112 and 114 allows differential positioning to be utilized for more accurate position determination including heading and tilt determinations for the antenna assembly. The positioning determinations are augmented using the inertial measurement unit 110 in some embodiments. The inertial measurement unit 110 is different than the inertial reference system of the aircraft 12. The placement of the inertial measurement unit 110 and the GNSS receivers 112 and 114 in the antenna assembly 100 reduces inaccuracies due to the dynamic structure of the aircraft 12 and the difference in position between the positioning sensors of the aircraft 12 and the antenna assembly 100 and allow a narrow beam to be more precisely pointed in some embodiments.

In some embodiments, the satellite communication system 50 is configured to receive television signals (e.g., continuous video signals) from the GEO satellite 20 and receive data signals (e.g., Internet data) from the MEO satellite 30B or the LEO satellite 40D. In some embodiments, the satellite communication system 50 locks on the GEO satellite 20 to receive TV signals and uses other beams working in concert with the transmit beam to track a LEO satellite 40A-G for data communication.

Figure 4:
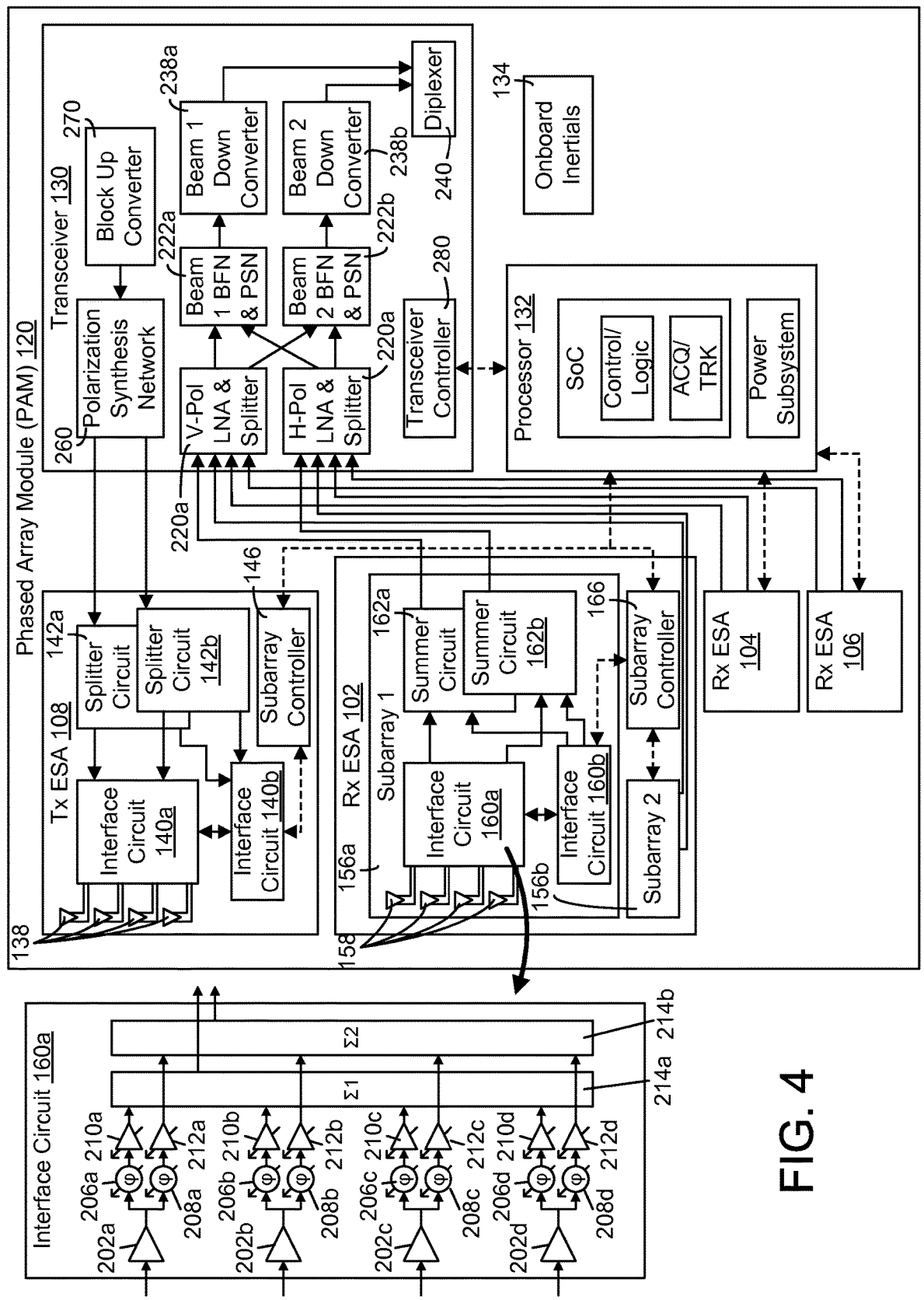
FIG. 4 is a schematic block diagram of a phase array module including a transceiver and antenna arrays of the phased array antenna assembly of the satellite communication system illustrated in FIG. 2 according to some embodiments.

With reference to FIG. 4, a phased array module 120 for the communication system 50 (FIG. 2) includes the Tx ESA 108, the Rx ESAs 102, 104, and 106, a transceiver 130, and a processor 132. The phased array module 120 includes components of the terminal 54 and the antenna assembly 100 in some embodiments. In some embodiments, the phased array module 120 is located in the antenna assembly 100. In some embodiments, the phased array module 120 includes on board inertial circuitry 134. In some embodiments, the phased array module 120 is configured to support links (e.g., the beams 44, 46, 48, and 52) to multiple constellations simultaneously or near simultaneously, regardless of protocol constraints that may prevent fast beam-hopping The processor 132 is configured to provide antenna control based on satellite ephemeris, transition table, phase array module (PAM) state information, firmware image, and received signal strength (RSSI) status. The processor 132 is part of one or more of GNSS receivers 112 and 114 and includes Ethernet communication circuitry and Tx/Rx timing circuitry in some embodiments. The processor 132 includes AESA and transceiver control, command and logic circuitry in some embodiments.

The Tx ESA 108 includes antenna elements 138, interface circuits 140A and 140B, splitter circuits 142A and 142B, and a sub array controller 146. In some embodiments, the Tx ESA 108 includes 768 antenna elements 138 that are providing signal in a frequency range between 14 and 14.5 giga Hertz (GHz) and a matrix of 12 by 16 interface circuits 140A. Each of the antenna elements 138 transmits a first polarization input signal and a second polarization input signal provided by the interface circuits 140A and 140B. The first polarization input signal is a vertical polarization signal and the second polarization signal is a horizontal polarization signal in some embodiments. Alternative polarization formats can be utilized.

The splitter circuits 142A and 142B provide the first polarization signal and the second polarization signal to the interface circuits 140A and 140B. The interface circuits 140A and 140B are silicon germanium phase adjustment and variable amplifier circuits under control of the subarray controller 146 in some embodiments. The subarray controller 146 controls the appropriate amount of gain and phase for the first polarization input signal and the second polarization signal to effect beam pointing to the satellites 20, 30A-C, and 40A-G. The processor 132 provides positioning data to the sub array controller 146 so that the beams are pointed in appropriate directions.

In some embodiments, the first polarization signal is provided for a first beam and the second polarization signal is provided for a second beam. In some embodiments, the combination of the first polarization signal and the second polarization signal allow different polarization formats to be formed. In some embodiments, the first polarization signal from the transceiver 130 is provided to the splitter circuit 142A and the second first polarization signal is provided to the splitter circuit 142A. Split versions of the first and second polarization signals are amplified and phase delayed in the interface circuits 140A and 140B for provision to the antenna elements 138.

The receive ESAs 102, 104 and 106 each include sub arrays 156A and 156B including antenna elements 158, interface circuits 160A and 160B, summer circuits 162A and 162B, and a sub array controller 156. In some embodiments, each sub array 156A and 156B of the Rx ESAs 102, 104, and 106 includes 280 antenna elements 158 that are receiving signals in a frequency range between 10.7 and 12.75 (GHz) and a matrix of 7 by 10 interface circuits 160A. Each of the antenna elements 158 provides a first polarization input signal and a second polarization input signal to the interface circuits 160A and 160B. The first polarization input signal is a vertical polarization signal and the second polarization signal is a horizontal polarization signal in some embodiments. The frequency ranges, antenna element numbers, and matrix sizes discussed above are exemplary only; other configurations are possible.

The summer circuits 162A and 162B receive the first polarization signal and the second polarization signal from the interface circuits 160A and 160B that were provided by the antenna elements 158. The interface circuits 160A and 160B are silicon germanium phase adjustment and variable amplifier circuits under control of the subarray controller 166 in some embodiments. The subarray controller 166 controls the appropriate amount of gain and phase for the first polarization input signal and the second polarization signal to effect beam pointing to the satellites 20, 30A-C, and 40A-G. The processor 132 provides positioning data to the sub array controller 166 so that the beams are appropriately pointed.

The interface circuits 160A and 160 B each include a set of buffers 202A-D, a set of phase control circuits 206A-D, a set of phase control or time delay circuits 208A-D, a set of variable gain amplifiers 210A-D, a set of variable gain amplifiers 212A-D, a summer 214A, and a summer 214B. The summers 214A and 214B provided the receive signals to the transceiver 130 on a first path for the first polarization signals and a second path for the second polarization signals in some embodiments.

In some embodiments, the antenna elements 138 and 158 are provided on a first side of their respective circuit boards. The integrated circuit packages for the interface circuits 140A and 140B, splitter circuits 142A and 142B, a sub array controller 146, interface circuits 160A and 160B, summer circuits 162A and 162B, a sub array controller 156 are provided on a second side of their respective circuit boards in some embodiments.

The transceiver 130 includes a vertical polarization low noise amplifier and splitter circuit 220A, a horizontal polarization low noise amplifier circuit 220B, a beam forming network circuit 222A, a beam forming network circuit 222B, a beam down converter circuit 238A and a beam down converter circuit 238B, and a diplexer 278. The transceiver 130 is coupled to a single modem in the modem circuit 90 (FIG. 3) in some embodiments. The low noise amplifier and splitter circuits 220A and 220B, the beam forming network circuits 222A and 222B, and the beam down converter circuits 238A and 238B provide separate receive paths for two beams in some embodiments. The vertical polarization low noise amplifier and splitter circuit 220A and the horizontal polarization low noise amplifier circuit 220B receive respective polarization signals from the summer circuits 162A and 162B. The beam forming network circuits 222A and 222B provide phase shift network and beam forming operations for the transceiver 130.

The transceiver 130 includes a polarization synthesis network circuit 260 and a block up converter 270 in some embodiments. The polarization synthesis network circuit 260 and a block up converter 270 provide the first and second polarization signals to two separate transmit paths associated with the splitter circuits 142A and 142B. In some embodiments, the block up converter 270 and the polarization synthesis network 230 provide first and second transmit RF signals to the splitter circuits 142A and 142B.

The transceiver 130 also includes a transceiver controller 280. In some embodiments, the transmit IF signal provided to the block up converter 270 is in a 0.95-1.95 GHz frequency range for GEO satellites and a 4.05-4.175 GHz range for LEO satellites. The IF receives signals for GEO satellites are in a frequency range 0.95-2.15 GHz, and the IF receive signals for LEO satellites are in a frequency range 1.85-2.1 GHz in some embodiments. Beam forming network circuits 222A and 222B provide beam forming functions and primary north/south station keeping functions.

Figure 5:
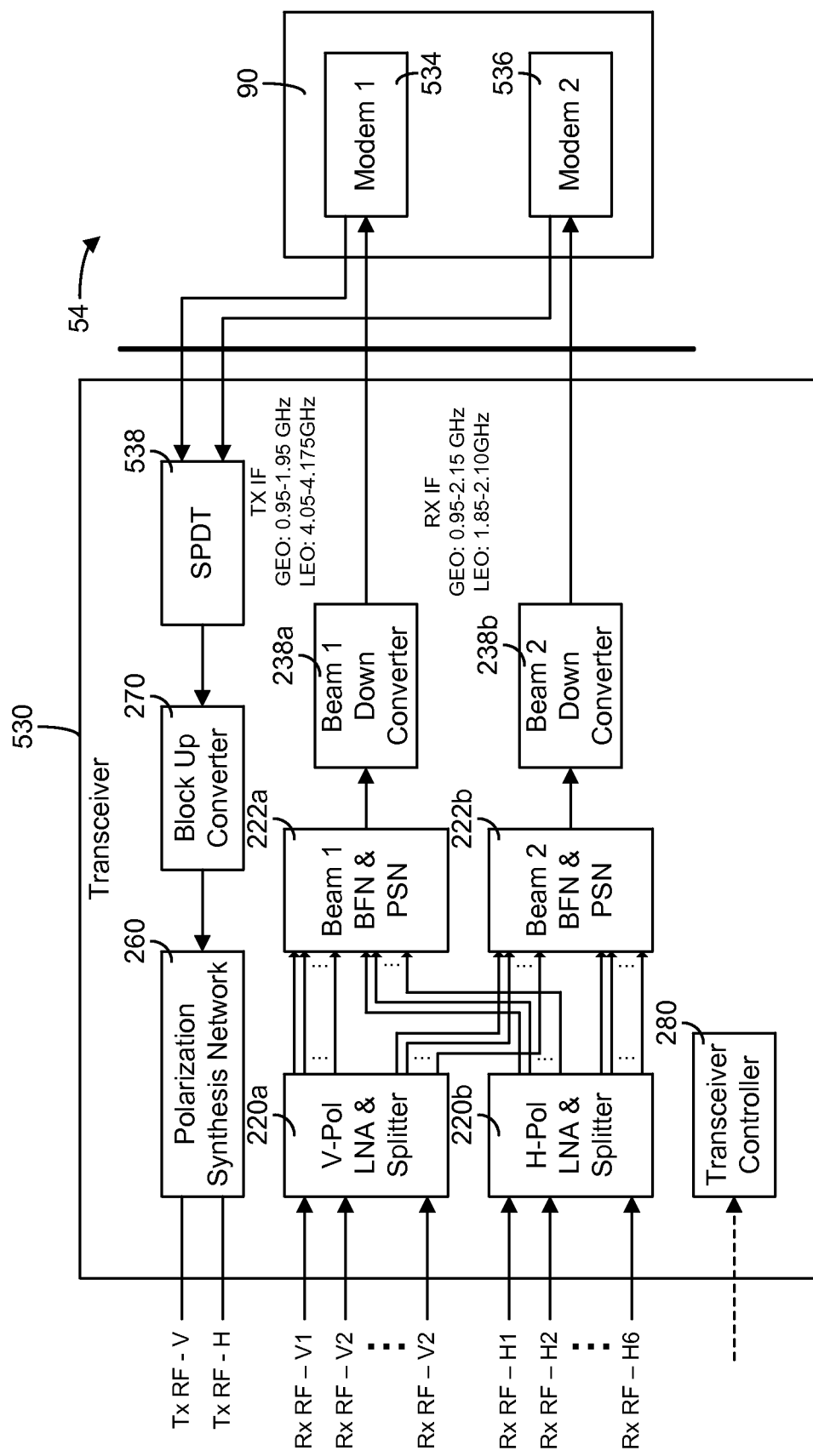
FIG. 5 is a schematic block diagram of a transceiver for a phase array module of the satellite communication system illustrated in FIG. 2 according to some embodiments.

With reference to FIG. 5, a transceiver 530 is similar to the transceiver 130 and is configured for use in the communication system 50. The transceiver 530 is coupled to a modem circuit 590 similar to the modem circuit 90. In some embodiments, the modem circuit 590 includes a first modem 534 and a second modem 536. The first modem 534 receives a signal from the beam down converter circuit 238A and the second modem 536 receives a signal from the beam down converter circuit 238B. Accordingly, transceiver 530 configured for use with modems 534 and 536 provides multi-modem terminal channel bonding. The transceiver 530 receives transmit signals from the modems 534 and 536 at a single pole, double throw (SPDT) module 538 which provides the transmit signals to the block up converter 270.

Figure 6:
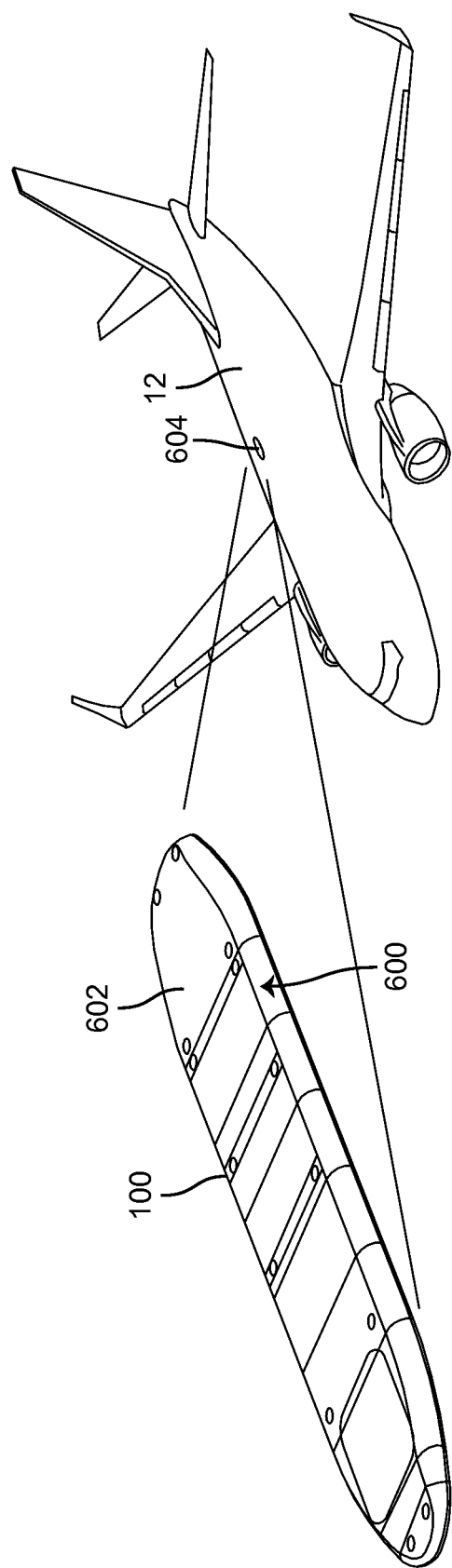
FIG. 6 is a perspective view schematic drawing illustrating the aircraft of FIG. 1 including the phased array antenna assembly of the satellite communication system illustrated in FIG. 2.

With reference to FIG. 6, the antenna assembly 100 is configured as a low profile and aerodynamic unit in accordance with some embodiments. The antenna assembly 100 is provided in a radome 600 and attached to a mounting plate 604 in some embodiments. The antenna assembly 100 is securely and environmentally mounted to the aircraft 12 via a type specific mounting plate such as the mounting plate 604. Service access is provided via a removable section 602 exposing the power supply 116 (FIG. 3), I/O terminals, bulkhead aperture 118, and at least one GNSS 114 receiver (e.g., the master receiver). The radome 600 is impact and weather proof (e.g., using a gasket) with RF windows for each of the ESAs 102, 104, 106, 108 (e.g., amplifier integrated panels) in some embodiments. Other access panels can be provided for servicing other components such as the ESAs 102, 104, 106, and 108. In some embodiments, a first, a single feed (ARINC 741/781) connection under the access cover or the removable section 602 is mounted to central sled on the adapter plate with the a single cable penetrating the fuselage via the bulkhead aperture 118 (FIG. 3).

Figure 7:
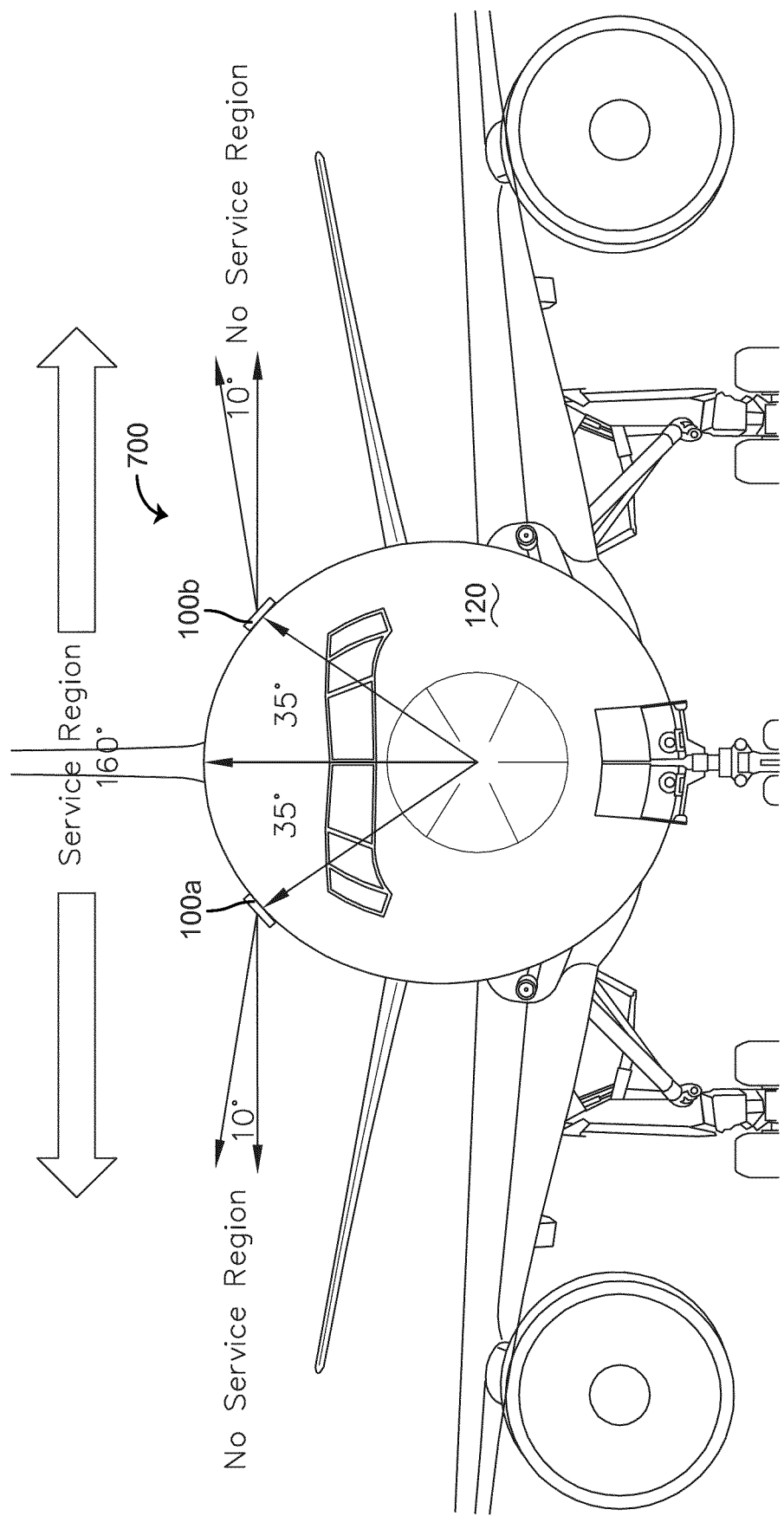
FIG. 7 is planar front view schematic drawing of the aircraft of FIG. 1 with a pair of antenna assemblies mounted at +35° and −35° lateral positions to the longitudinal axis of the fuselage.

With reference to FIG. 7, the aircraft 12 includes a dual antenna assembly system including an assembly 100A and an assembly 100B disposed on a top region of the aircraft 12. The assemblies 100A and 100B are each similar to the antenna assembly 100 discussed with reference to FIGS. 1-5 in some embodiments. The antenna assemblies 100A and 100B are placed in parallel 35 degrees clockwise and counter clockwise from the longitudinal axis of an aircraft 200 in some embodiments. Such a configuration provides 160 degrees of service region coverage.

Figure 8:
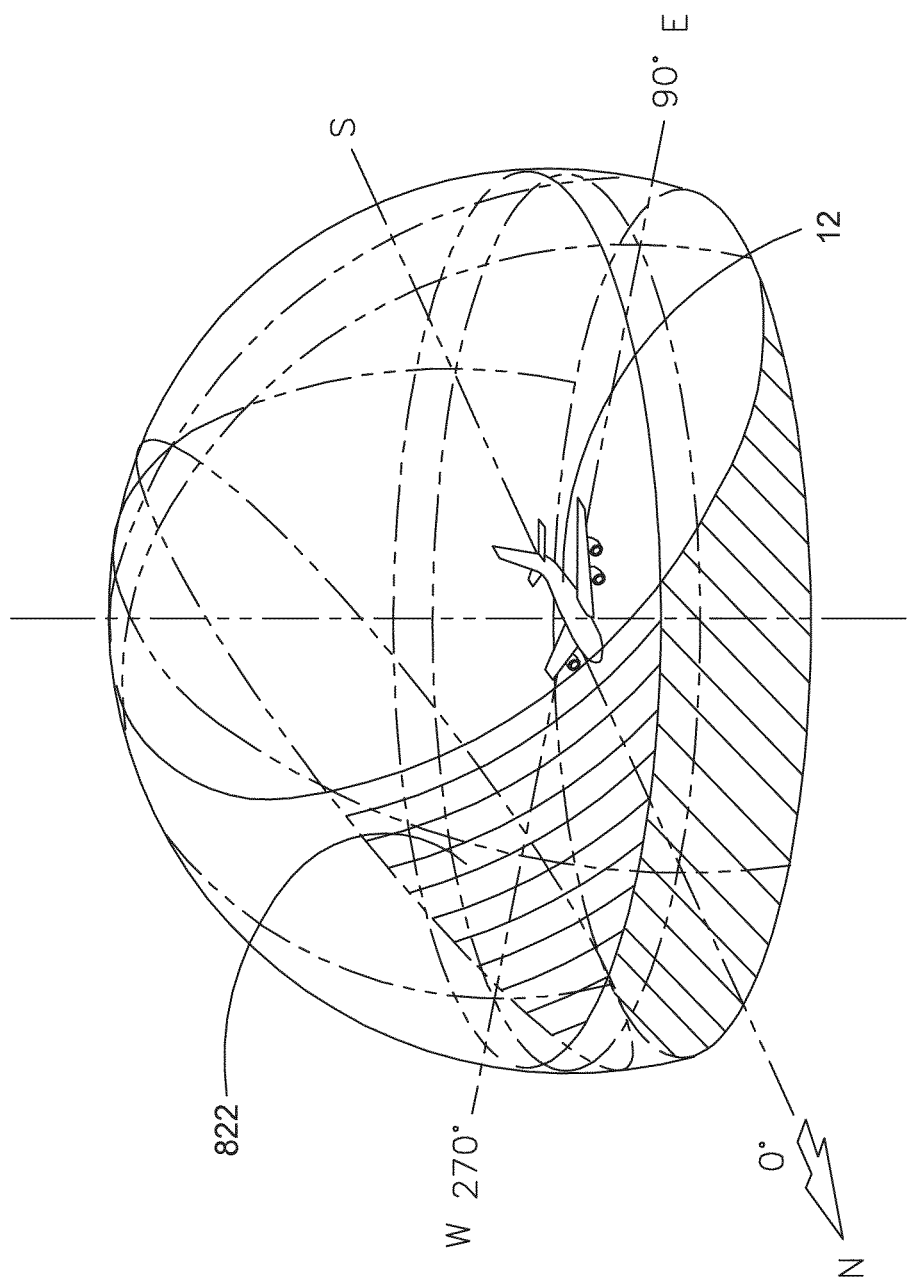
FIG. 8 is a perspective view schematic drawing illustrating a transport aircraft flying North and showing PAM look angles, aperture loss, and area of keyhole effect.
Figure 10:
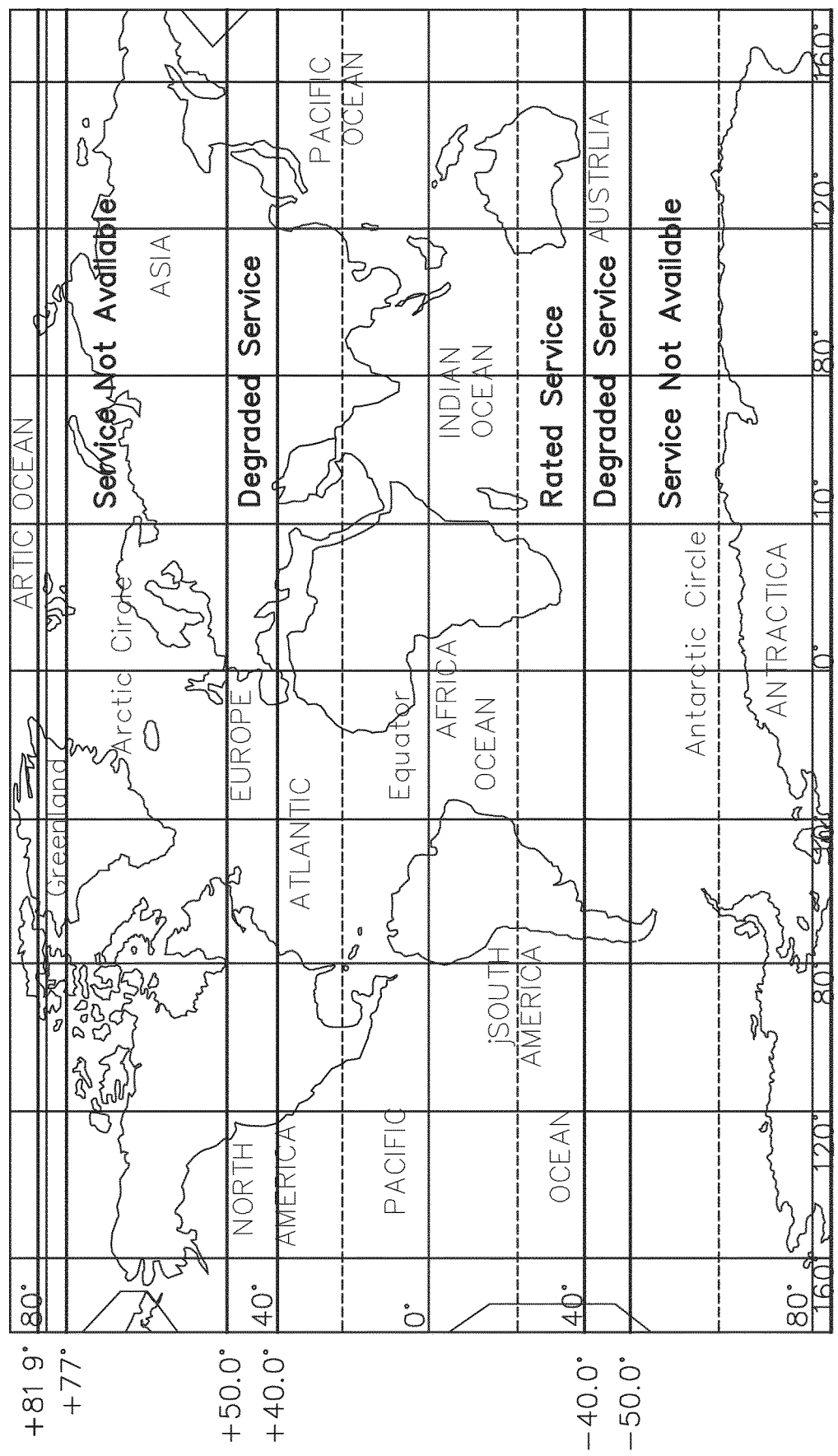
FIG. 10 is a map illustrating prior art performance of a satellite communication network.
Figure 11:
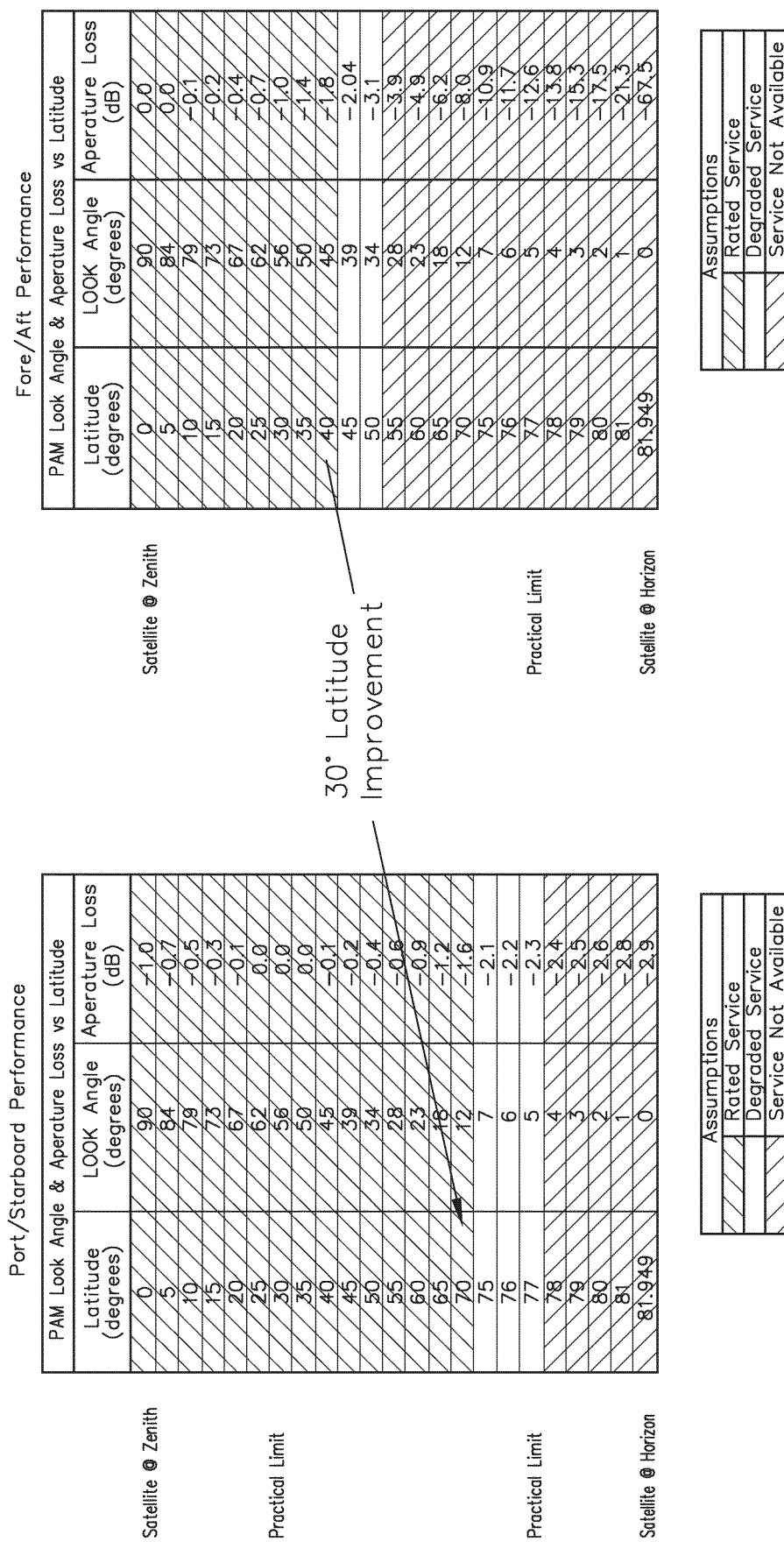
FIG. 11 is a pair of tables illustrating prior art fore/aft performance as compared to the port/starboard performance according to some embodiments.

FIG. 8 illustrates a keyhole effect region 822 inherent in polar route flights. The use of the antenna assemblies 100A and 100B (FIG. 7) reduces the size of the keyhole region 822 by increasing azimuth. FIGS. 9 and 10 prophetically illustrate single antenna assembly prior art service range. FIG. 11 prophetically illustrates currently calculated and expected dual antenna assembly system 700 (FIG. 7) configurations according to some embodiments.

A single antenna assembly, fore/aft dual antenna assembly, or a port/starboard dual antenna assembly for the communication system 50 is installed on the aircraft 12 and the terminal 54 and APM 56 are installed in an equipment rack. The antenna assembly 100 consumes 150 W, weighs 25 lbs., creates 5 lbs. of drag, and is 2 inches high, 60 inches long, and 12 inches wide (approximately) which is superior to characteristics of conventional antenna assemblies in some embodiments. In some embodiments, the terminal 54 is either connected to the aircraft 12 via an MCU 176 LRU 178, or according to ARINC 791 compliant host. More weight and added system complexity are added when the antenna assembly 100 is connected via an MCU LRU. However, maintenance is more conventional and direct in some embodiments. When the antenna assembly 100 is connected to a ARINC 791, host terminal weight and complexity are reduced but overhead maintenance access is required.

In some embodiments, a multi-panel AESA antenna assembly made from aluminum is both electromagnetic interference (EMI) and environmentally sealed. All boards and critical components are heat sunk to a central sled chassis via an aviation grade thermal interface material. The unit or important environmentally exposed parts and assemblies are coated with a hydrophobic conformal coat to shed water and dirt without impacting RF performance. Aspects of some embodiments include a platform I/O with EMI/EMC protection/filtering within a dedicated EMI enclosure. A high current power supply provides the antenna assembly 100 with power from aircraft 12 (FIG. 2) (ESA: PA, Driver, 3.3V; Control: 8V) and is enclosed within a dedicated EMI enclosure. In some embodiments, the Rx ESAs 102, 104, and 106 are disposed using circuit card assemblies including an amplifier, antennae, low current power supplies, and capacitor banks. In some embodiments, the Tx ESAs include an antennae, low current power supplies, capacitor banks, and a GNSS receiver. In some embodiments, a control circuit card assembly includes a transceiver, acquisition & tracking system (e.g., an SoC), local power supplies, and a modem (e.g., all in a dedicated EMI enclosure). In some embodiments, a flex interconnect circuit card assembly hosts ESA SPI control. Ethernet communication from platform RF from the various ESA panels is managed via cables with power routes via large gauge wire and terminal lugs.

In some embodiments, a multi-panel ESA antenna assembly (e.g., antenna assembly 100) with a sled and distributed power supplies connect various components to the power supply. A large aperture is provided in a preferred construction by combining three Rx panels (ESAs 102, 104, 106) each with its own amplifier. A Tx panel (e.g., ESA 108) is provided at the rear of the sled. In some embodiments, each panel (ESAs 102, 104, 106, & 104) includes a GNSS receiver 112 with at least one inertial measurement unit 110 for the combined panel assembly. An access cover with a break-away service tether provides maintenance access to pendent I/O cables entering the aircraft 12. In some embodiments, integrated lightning diversion strips terminate on the sled (chassis). In some embodiments, a low drag antenna assembly 100 has a mass of approximately 25 lbs., drag of 5 lbs., a height of approximately 2 inches high, 17 inches wide, and 72 inches long.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter. The foregoing description of exemplary embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:
1. A satellite communication system for an aircraft communicating with at least one satellite constellation, the satellite communication system comprising:

a phased array antenna system; and a transceiver configured to communicate with a plurality of satellite constellations, the transceiver being configured to support a plurality of links to two or more satellites in at least one satellite constellation of the satellite constellations or to one satellite in each of two or more of the satellite constellations via the phased array antenna system, wherein the transceiver comprises a first beam downconverter and a second beam down converter, wherein the phased array antenna system further comprises at least two receiver electronically scanned arrays (ESAs), and at least one transmitter electronically scanned array (ESA), wherein a first beam for a first link of the links is received by a first receiver ESA of the receiver ESAs and provided via the first beam downconverter, and a second beam for a second link of the links is received by a second receiver ESA of the receiver ESAs and is provided via the second beam downconverter simultaneously with the first receive signal provided by the first beam downconverter, wherein the at least two receiver electronically scanned arrays (ESAs) and the at least one transmitter electronically scanned array (ESA) are disposed in a single housing.

2. The system for an aircraft of claim 1, wherein the phased array antenna system further comprises:

(a) a pair of low profile diversity satellite communication antenna assemblies, each of the antenna assemblies displaced laterally substantially in parallel along a longitudinal axis of the aircraft, a first of the antenna assemblies including the at least two receiver electronically scanned arrays (ESAs), and the at least one transmitter electronically scanned array (ESA), a second of the antenna assemblies including at least two receiver electronically scanned arrays (ESAs), at least one second electronically scanned array (ESA), the antenna assemblies respectively positioned on two opposing lateral sides of the longitudinal axis of the aircraft, wherein a pointing direction of the first antenna assembly is offset by between 30 and 40 degrees in a clockwise direction with respect to the longitudinal axis of the aircraft and a pointing direction of the second antenna assembly is offset by between 30 and 40 degrees in a counterclockwise direction with respect to the longitudinal axis of the aircraft;

(b) wherein the single housing is a first low drag housing and the second of the antenna assemblies includes a second low drag housing, each housing having an overall height of less than 6.0 cm; and (c) an adapter plate for attaching each of the antenna assemblies to the aircraft.

3. The system for an aircraft of claim 1, wherein the phased array antenna system comprises: a housing comprising at least two receiver electronically scanned arrays (ESAs), at least one transmitter electronically scanned array (ESA); and an adapter plate.

4. The system for an aircraft of claim 3, wherein the adapter plate is configured for attaching the antenna to a wing of the aircraft or the adapter plate is configured for attaching the antenna to the fuselage of the aircraft.

5. The system for an aircraft of claim 3, wherein the adapter plate is configured for attaching the antenna to a wing tip of the aircraft.

6. A satellite communication system for an aircraft communicating with at least one satellite constellation, the satellite communication system comprising:

a phased array antenna system; and a transceiver configured to communicate with a plurality of satellite constellations, the transceiver being configured to support a plurality of links to two or more satellites in at least one satellite constellation of the satellite constellations via the phased array antenna system, wherein the phased array antenna system further comprises:

(a) a pair of low profile diversity satellite communication antenna assemblies, each of the antenna assemblies displaced laterally substantially in parallel along a longitudinal axis of the aircraft, each of the antenna assemblies including at least two receiver electronically scanned arrays (ESAs), at least one transmitter electronically scanned array (ESA), the antenna assemblies respectively positioned on two opposing lateral sides of the longitudinal axis of the aircraft, wherein a pointing direction of the first antenna assembly is offset by between 30 and 40 degrees in a clockwise direction with respect to the longitudinal axis of the aircraft and a pointing direction of the second antenna assembly is offset by between 30 and 40 degrees in a counterclockwise direction with respect to the longitudinal axis of the aircraft;

(b) a low drag housing for each of the antenna assemblies, each housing having an overall height of less than 6.0 cm; and (c) an adapter plate for attaching each of the antenna assemblies to the aircraft, wherein both of the offset in the clockwise direction and the offset in the counterclockwise direction are 35 degrees.

7. The system for an aircraft of claim 5, wherein the adapter plate and the housing is generally shaped in the form of a low profile elongated ellipse.

8. The system for an aircraft of claim 3, wherein the adapter plate and housing or sized smaller than 160 cm L×35 cm W×5.5 cm.

9. The system for an aircraft of claim 1, further comprising at least one GNSS receiver.

10. The system for an aircraft of claim 1, further comprising an inertial measurement.

11. The system for an aircraft of claim 1, further comprising a power supply.

12. The system for an aircraft of claim 2, wherein the transceiver further comprises a controller, the controller configured for selectively activating at least one of:

(a) at least one of the at least one ESA receivers of at least one of the pair of the antenna assemblies individually for providing a first coverage area in a first direction offset from the longitudinal axis of the aircraft, (b) at least one of the other at least one ESA receivers of at least one of the pair of the antenna assemblies individually for providing a second coverage area in a second direction offset from the longitudinal axis of the aircraft, (c) at least one pair of ESA receivers from one of the antenna assemblies jointly for providing a third coverage area between the first coverage area and the second coverage area, or (d) the ESA receivers of the pair of the antenna assemblies jointly for providing a fourth coverage area.

13. The phased array satellite communication system of claim 12, wherein the first receive signal and the first transmit signal have a first polarization and the second receive signal and the second transmit signal have a second polarization, the second polarization being different than the first polarization.

14. A phased array satellite communication system for an aircraft, comprising:
a phased array antenna system; and
transceiver configured to communicate with a plurality of satellite constellations, the transceiver configured to provide a first transmit signal for a first beam to a first satellite constellation system and a second transmit signal for a second beam to a second satellite constellation system, and the transceiver configured to simultaneously receive a first receive signal for the first beam from the first satellite constellation system and a second receive signal for the second beam from the second satellite constellation system, wherein the transceiver comprises an up converter, a first beam downconverter and a second beam down converter, wherein the phased array antenna system further comprises:
at least two receiver electronically scanned arrays (ESAs), and at least one transmitter electronically scanned array (ESA), wherein the first receive signal is received by a first receiver ESA of the receiver ESAs and provided via the first beam downconverter, and the second receive signal is received by a second receiver ESA of the receiver ESAs and is provided via the second beam downconverter simultaneously with the first receive signal provided by the first beam downconverter, wherein the first transmit signal and the second transmit signal are provided to the transmitter ESA via the up converter wherein the at least two receiver electronically scanned arrays (ESAs) and the at least one transmitter electronically scanned array (ESA) are disposed in a low profile housing.

15. The phased array satellite communication system of claim 14,
wherein the transceiver comprises a first transmit splitter for the first beam and a second transmit splitter for the second beam.

16. The phased array satellite communication system of claim 14, wherein the transceiver comprises a first receiver summer for the first receive signal and a second receiver summer for the second receive signal, a first set of receiver phase or time delay circuits for a receive signal and a second set of phase or time delay circuits for the second receive signal.

17. The phased array satellite communication system of claim 15, wherein the transceiver comprises a first set of receiver variable gain amplifier circuits for the first receive signal and a second set of variable gain circuits for the second receive signal.

18. The phased array satellite communication system of claim 14, wherein the transceiver comprises a first modem for the first transmit signal and first receive signal and a second modem for the second transmit signal and the second receive signal.

19. A method of communicating data in an aircraft, the method comprising:
establishing a communication link with a phased array antenna module to a low earth orbit satellite system, wherein the phased array antenna module further comprises:
at least two receiver electronically scanned arrays (ESAs), at least one transmitter electronically scanned array (ESA), a first beam downconverter, and a second beam down converter, wherein the communication link with the phased array antenna system to the low earth orbit satellite system uses a first receive signal received by a first receiver ESA of the receiver ESAs and provided via the first beam downconverter; and
establishing a communication link with the phased array antenna module to a geostationary orbit satellite system, wherein the communication link with the phased array antenna module to the geostationary orbit satellite system uses a second receive signal simultaneously received with the first receive signal, the second receive signal being received by a second receiver ESA of the receiver ESAs and provided via the second beam downconverter, wherein the at least two receiver electronically scanned arrays (ESAs) and the at least one transmitter electronically scanned array (ESA) are disposed in an antenna housing.

20. The method of claim 19 wherein the communication link with the phased array antenna system to the geostationary orbit satellite system and the communication link with the phased array antenna system to the low earth orbit satellite system are established simultaneously.

* * * * *